US010084267B2

(12) United States Patent
Clarius

(10) Patent No.: US 10,084,267 B2
(45) Date of Patent: Sep. 25, 2018

(54) CONNECTOR HAVING POWER SENSING AND SUPPLY CAPABILITY

(71) Applicant: Sunrise Medical (US), LLC, Fresno, CA (US)

(72) Inventor: Daniel J. Clarius, Missouri City, TX (US)

(73) Assignee: Sunrise Medical (US) LLC, Fresno, CA (US)

( * ) Notice: Subject to any disclaimer, the term of this patent is extended or adjusted under 35 U.S.C. 154(b) by 348 days.

(21) Appl. No.: 14/868,382

(22) Filed: Sep. 28, 2015

(65) Prior Publication Data

US 2016/0093989 A1 Mar. 31, 2016

Related U.S. Application Data

(60) Provisional application No. 62/056,241, filed on Sep. 26, 2014.

(51) Int. Cl.

| | |
|---|---|
| ***H02H 3/42*** | (2006.01) |
| ***H01R 13/703*** | (2006.01) |
| ***H01R 13/68*** | (2011.01) |
| ***H01R 24/58*** | (2011.01) |
| ***A61G 5/04*** | (2013.01) |
| *H01R 107/00* | (2006.01) |

(52) U.S. Cl.

CPC ............. *H01R 13/703* (2013.01); *A61G 5/04* (2013.01); *H01R 13/68* (2013.01); *H01R 24/58* (2013.01); *A61G 2203/14* (2013.01); *H01R 2107/00* (2013.01)

(58) Field of Classification Search

CPC ...... A61G 5/04; A61G 2203/14; H01R 13/68; H01R 13/703; H01R 24/58; H01R 2107/00

USPC .......................................................... 307/126

See application file for complete search history.

(56) References Cited

U.S. PATENT DOCUMENTS

| | | | | |
|---|---|---|---|---|
| 4,507,720 | A | 3/1985 | Colbrese | |
| 5,884,086 | A | 3/1999 | Amoni et al. | |
| 7,296,107 | B2 | 11/2007 | Lunsford et al. | |
| 7,820,904 | B1 | 10/2010 | Robling et al. | |
| 7,880,475 | B2 | 2/2011 | Crumlin et al. | |
| 7,912,501 | B2 | 3/2011 | Johnson et al. | |
| 8,024,491 | B1 | 9/2011 | Wright et al. | |
| 8,074,007 | B2 | 12/2011 | James | |
| 8,565,444 | B2 | 10/2013 | Johnson | |
| 8,648,501 | B2 * | 2/2014 | Bhargava .......... | H04M 1/72527 307/116 |
| 8,868,816 | B2 * | 10/2014 | Kim .................... | G06F 13/4022 381/74 |

(Continued)

*Primary Examiner* — Rexford Barnie
*Assistant Examiner* — Toan Vu
(74) *Attorney, Agent, or Firm* — MacMillan, Sobanski & Todd, LLC

(57) ABSTRACT

An electric circuit is provided with a single jack for connection to either a first remote powered device via a first plug or a second remote unpowered device via a second plug. A power requirement detection circuit is provided for generating a control signal representing whether the connected plug is the first plug or the second plug. A normally deactivated switch is connected between the power source and the jack and is operable to supply power to the jack when activated. A switch activation circuit is responsive to the control signal for actuating the switch when the first plug is connected.

8 Claims, 4 Drawing Sheets

(56) References Cited

U.S. PATENT DOCUMENTS

| | | | | |
|---|---|---|---|---|
| 2007/0105415 | A1 | 5/2007 | Jin et al. | |
| 2010/0057946 | A1* | 3/2010 | Crumlin | H01R 13/7039 710/16 |
| 2011/0093643 | A1* | 4/2011 | Hung | G06F 13/409 710/316 |
| 2012/0081102 | A1 | 4/2012 | Gao et al. | |
| 2013/0021046 | A1 | 1/2013 | Prentice et al. | |
| 2014/0241535 | A1 | 8/2014 | Poulsen et al. | |
| 2015/0134893 | A1* | 5/2015 | Anderson | G06F 3/0619 711/103 |

* cited by examiner

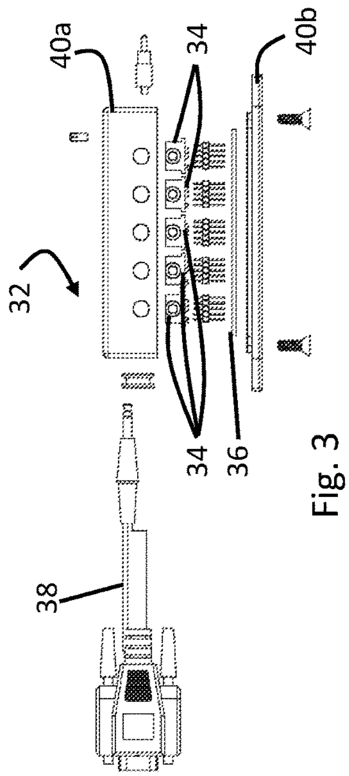
Fig. 3
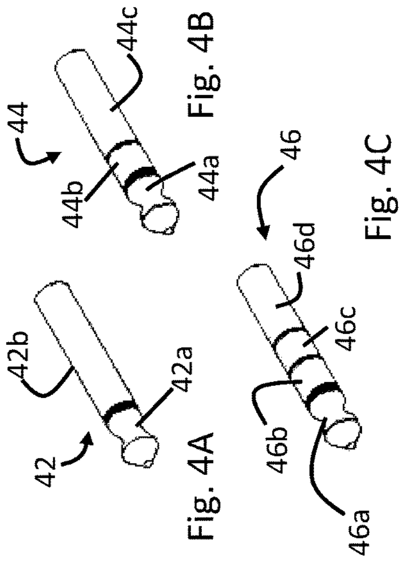
Fig. 4A
Fig. 4B
Fig. 4C
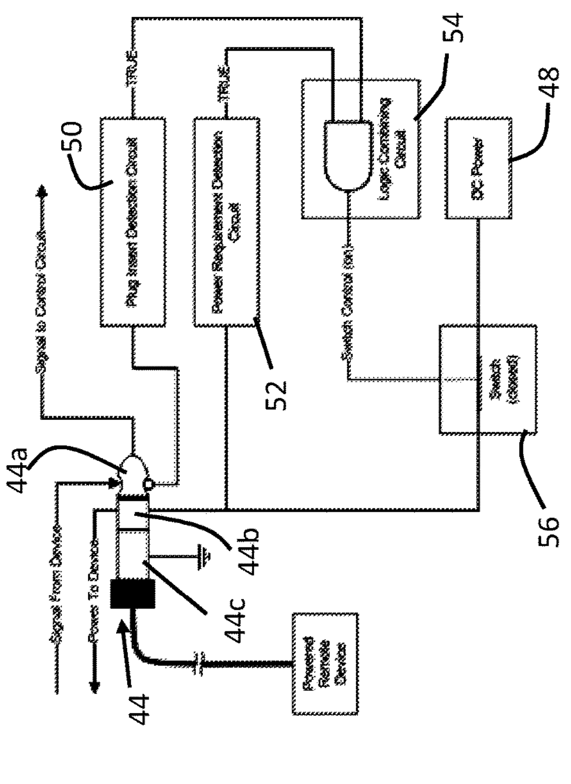
Fig. 5A
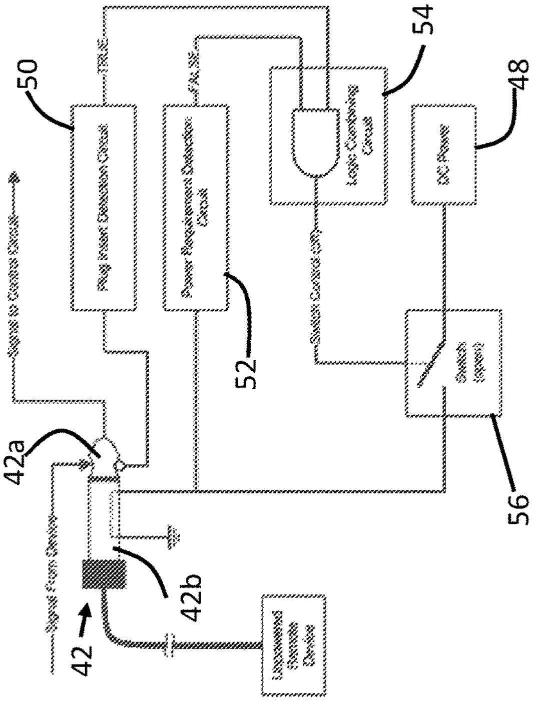
Fig. 5B

CONNECTOR HAVING POWER SENSING AND SUPPLY CAPABILITY

CROSS-REFERENCE TO RELATED APPLICATIONS

This application claims the benefit of U.S. Provisional Application No. 62/056,241; filed Sep. 26, 2014, the disclosure of which is incorporated herein by reference.

BACKGROUND OF THE INVENTION

This invention relates in general to electrical and electronic connectors. In particular, this invention relates to a connection circuit having one or more receptacles for coupling a first electronic device to a second electronic device where the coupling determines and provides a required power level to the first device. In a preferred embodiment, the invention relates to a wheelchair drive control system having a power sensing connector to facilitate interfacing of peripheral devices to the drive control unit.

Powered wheelchairs rely on peripheral input and sensing devices to control operation of the drive system and compensate for the physical limitations and disabilities of the user. Some wheelchair users have significant cognitive and physical limitations to operate standard input devices, such as a joystick or touch pad. Peripheral input devices, such as sip-and-puff inputs, head array controls, chin controls, and the like provide alternative means to operate a wheelchair and accommodate a user's special needs. These devices rely on various sensors and may have different power and signal connection requirements. Some peripherals may be switch devices that do not require power, others may include sensors that depend on charge or voltage inputs to function. Typically, when various peripheral devices have signal and power requirements to operate, separate power and data feeds are provided to energize these devices and provide the necessary signal communication with the controller. Such an arrangement necessitates separate connections, wiring harnesses, and logistics in cable routing to power these devices and connect them with the controller. In addition, multiple connectors and wires adds complexity and cost to wheelchair systems in order to accommodate the wide range of adaptive devices necessary for satisfying disparate user requirements. It would be desirable if a connector system could determine the power and data connection requirements of a peripheral device and provide the necessary electrical and electronic feeds to operate the device automatically.

SUMMARY OF THE INVENTION

This invention relates to a connection receptacle for coupling a first electronic device to a second electronic device where the coupling determines and provides a required power level to the first device. In a preferred embodiment, the invention relates to a wheelchair drive control system having a power sensing connector to facilitate interfacing of peripheral devices to the drive control unit.

In particular, the invention provides an electric circuit for connection to either a first remote powered device or a second remote unpowered device. The first remote device has a first plug requiring connection to a power source and the second remote device has a second plug not requiring connection to the power source. The circuit comprising a single jack (which may be a T/R/S type jack, or any suitable plug and jack design) adapted to be connected to either the first plug or the second plug. A power requirement detection circuit is provided for generating a control signal representing whether the connected plug is the first plug or the second plug. A normally deactivated switch is connected between the power source and the jack and is operable to supply power to the jack when activated. A fuse may optionally be connected between the switch and the power source. A switch activation circuit is responsive to the control signal for actuating the switch when the first plug is connected, and for maintaining the switch in a deactivated state when the second plug is connected. The switch activation circuit may optionally include a soft start circuit for gradually activating the switch.

Optionally, the electric circuit may include a plug insert detection circuit for generating a second control signal representing whether either the first or second plug has been connected to the jack. In this case, the switch activation circuit is responsive to the first and second control signals. The electric circuit according to claim 1 and further including a fuse connected between the switch and the jack. Preferably, the first remote device is operable to provide a first data signal to the electric circuit via the first plug, and wherein second remote device is operable to provide a second data signal to the electric circuit via the second plug.

Various aspects of this invention will become apparent to those skilled in the art from the following detailed description of the preferred embodiment, when read in light of the accompanying drawings.

BRIEF DESCRIPTION OF THE DRAWINGS

FIG. 3 is an exploded view of another embodiment of a power sensing connector in accordance with the invention.

FIG. 4A is a perspective view of a tip-sleeve male connector.

FIG. 4B is a perspective view of a tip-ring-sleeve male connector.

FIG. 4C is a perspective view of a tip-ring-ring-sleeve male connector.

FIG. 5A is a schematic illustration of a simplified block diagram of the invention under the conditions of receiving a plug that requires a power source.

FIG. 5B is a schematic illustration of a simplified block diagram of the invention under the conditions of receiving a plug that does not require a power source.

DETAILED DESCRIPTION OF THE PREFERRED EMBODIMENT

Figure 1:
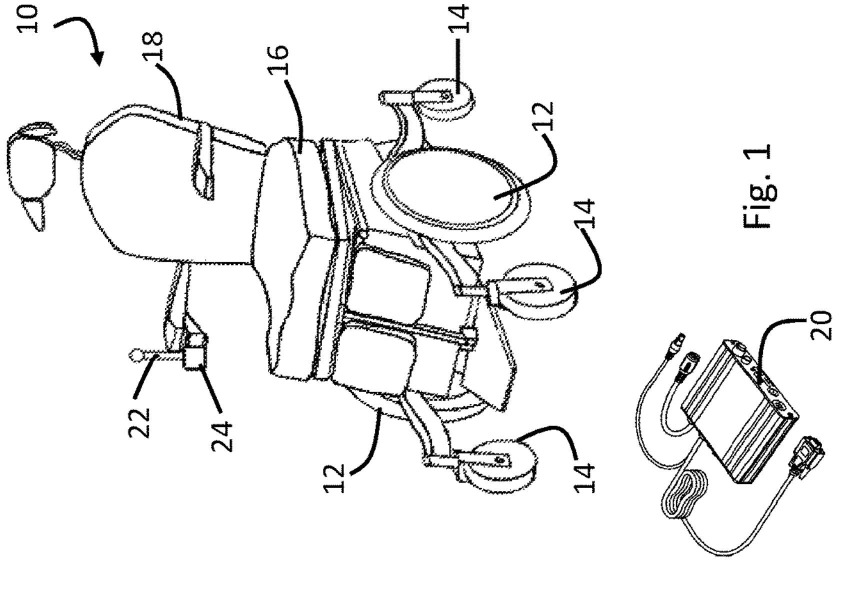
FIG. 1 is a perspective view of a power wheelchair having a power sensing connector in accordance with the invention.

Referring now to the drawings, there is illustrated in FIG. 1 a power driven wheelchair, shown generally at 10. The exemplary power wheelchair is illustrated as a mid-wheel drive wheelchair, however, it should be understood that the power driven wheelchair 10 may be of a front wheel drive configuration, rear wheel drive configuration, or other suitable drive configuration. The wheelchair 10 includes drive wheels 12 and stabilizing caster wheels 14 as are well known in the art. The wheelchair 10 further includes a seat 16 and backrest 18. The power driven wheelchair 10 includes a controller 20 that receives command inputs from an input device, such as a joystick 22. In the illustrated embodiment, the joystick 22 includes a power sensing connector system 24. While illustrated as part of the joystick 22, in other embodiments the power sensing connector system 24 may also be configured as a separate system, as will be described in conjunction with FIG. 3.

Figure 2A:
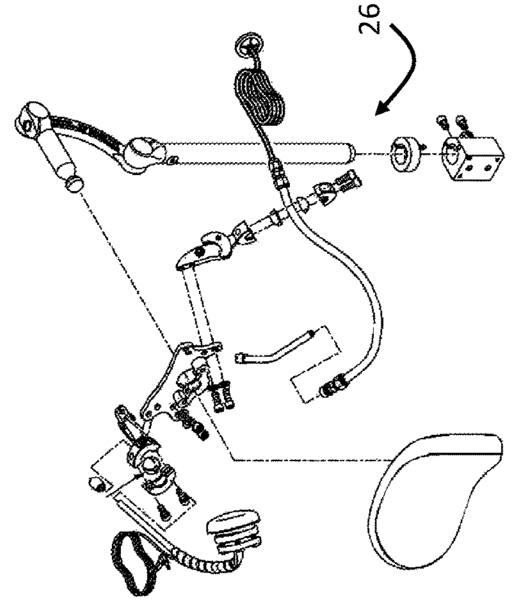
FIG. 2A is a perspective, exploded view of a sin and puff input device.
Figure 2B:
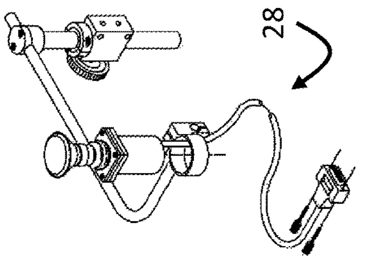
FIG. 2B is a perspective view of a microlight accessory device.
Figure 2C:
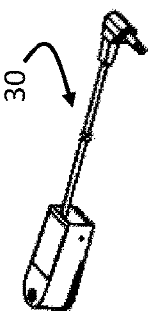
FIG. 2C is a perspective view of a chin control accessory device.

As shown in FIGS. 2A-2C, there are illustrated three examples of various peripheral devices that may be used with the power sensing connector system 24. FIG. 2A is a sip-and-puff input device 26. In one embodiment, the sip-and-puff input device 26 may be configured to operate as a passive switch, which does not need a power supply to operate. Other embodiments of the sip-and-puff input device 26 may utilize power to operate. FIG. 2B is a chin control input device 28, which may also be configured as a passive switch that does not require power to operate. FIG. 2C is a micro-light 30 peripheral accessory that is an example of an active device that requires a power source to operate. These peripheral devices are merely examples of various passive and active peripheral accessory devices. Other devices, such as cellular phones, computers, home assistance devices, and other operational input devices and sensors are other examples of devices suitable for use with the embodiments of the power sensing connector system 24. Thus, any suitable peripheral device may be used and remain within the scope of the invention.

Referring now to FIG. 3, there is illustrated another embodiment of a power sensing connector system 32. This embodiment of the power sensing connector system 32 operates in a similar manner to the power sensing connector system 24 yet is packaged as a separate unit that may be adapted to an existing wheelchair controller system, rather than being integrated into another component. The power sensing connector system 32 includes a plurality of jacks 34. The connectors 34 are in electrical communication with a circuit board 36. The circuit board 36 includes an electronic circuit that carries out the operational steps illustrated in FIG. 6. In one embodiment, the electronic circuit of circuit board 36 is illustrated by a circuit diagram 100 of FIG. 7. A controller lead 38 connects the various jacks 34 to the controller 20 such that data may be transmitted between the controller 20 and any of the various peripheral devices along with a power source, such as for example a 12 volt power source. The power source is configured to supply voltage and current levels sufficient to energize and operate the peripheral devices. In one embodiment, these voltage and current levels may be in a range of about 2 volts to about 12 volts and in a current capacity of about 1 ampere to about 15 amperes. The power supply supplies power levels higher that what is understood to be a low current biasing voltage power level. The components of the power sensing connector system 32 are enclosed in a housing 40*a* and 40*b*.

Referring now to FIGS. 4A, 4B, and 4C, there are illustrated three types of male connectors, broadly characterized as phone connectors, though other types of connectors may be used if desired. FIG. 4A is a tip-sleeve or TS male connector shown generally at 42. The TS connector 42 includes a tip contact 42*a* and a sleeve contact 42*b*. Generally, the tip contact 42*a* is configured to transmit data, such as sensor information or control output signals to the controller 20. The sleeve contact 42*b* is typically configured as a common or ground contact that completes a communication circuit between the peripheral device and the controller 20. Often, the TS connector is used in conjunction with passive, or unpowered, devices. FIG. 4B illustrates a tip-ring-sleeve or TRS connector 44. The TRS connector 44 includes a tip contact 44*a*, similar to tip contact 42*a*, that transmits data between the peripheral device and the controller 20. A sleeve contact 44*c* is functionally similar to sleeve contact 42*b* as providing an electrical ground. In this particular embodiment, the sleeve contact 44*c* is shorter in length than the sleeve contact 42*b*. The TRS connector 42 includes a ring contact 44*c*, disposed between the tip contact 44*a* and the sleeve contact 44*c*. The ring contact 44*c* is configured to provide power, such as an operating voltage and current level, to an active peripheral device. Referring to FIG. 4C, there is illustrated a third connector configured as a tip-ring-ring-sleeve or TRRS connector 46. The TRRS connector 46 is similar to TRS connector 44 in that there is a tip contact 46*a* and a sleeve contact 46*d*, configured similarly to the TS and TRS connectors 42 and 44, respectively. The TRRS connector 46 includes first and second ring contacts 46*b* and 46*c*. These ring contacts 46*b* and 46*c* may be configured to supply power to the peripheral device, provide addition data or command signals or provide a charging service for remote power sources used in the peripheral device.

FIG. 5A shows a simplified block diagram of the invention under the conditions of receiving a plug that requires a power source 48, which may be a DC power source, AC power source, or any other power source desired. The plug may be of any type that has a dedicated contact to receive power from the host device that houses the jack. A common type of plug that would work for this purpose is the T/R/S phone connector 44 which has the tip, ring and sleeve contact, as described above. The tip 44*a* can be used to carry a signal to or from a remote device while the ring 44*b* can be the dedicated contact for the power supplied to that remote device. The sleeve 44*c* is typically a shared ground for the two other contacts. The invention has a plug insert detection sub-circuit 50 which through some means of mechanical and/or electrical sensing is able to confirm if there is a plug present in the jack. The invention also has the ability to detect if the remote device requires power. In the case of a using a T/R/S plug, the power requirement detection sub-circuit 52 will sense the existence of the ring contact 44*b* as well as its ability to receive power. If it is confirmed that the remote device requires power, the resulting output of the sub-circuit 52 will be a logic TRUE. If the plug insert detection sub-circuit also results with a logic TRUE, then the logic combining sub-circuit or switch activation circuit 54 will allow switch 56 to close. This will allow power to be supplied to the power contact on the plug. The switch may be in the form of a semiconductor, such as a MOSFET. Or, it may be an electro-mechanical type, such as a relay. If either sub-circuit 50 or sub-circuit 52 provide a logic FALSE, then the switch 56 will remain open and not close.

FIG. 5B shows a simplified block diagram of the invention under the conditions of receiving a plug that does not require a power source. The plug may be of any type that does not have a dedicated contact to receive power from the host device that houses the jack. If an embodiment uses the previously mentioned phone connector type plug, a device that does not require power may use the version of T/S plug 42 on that plug where there is no ring contact present. There is only the tip 42*a* and a sleeve 42*b*. In this case, if a T/S plug (or any plug that does not require power) is inserted into the jack, the power requirement detection sub-circuit 52 will not sense the existence of a ring or dedicated power contact, and the sub-circuit will output a logic FALSE. Also in this particular case, the plug insert detection circuit will still sense the plug present in the jack, and this results in a logic output of TRUE. However, because sub-circuit 52 and sub-circuit 54 are not both TRUE, the switch 56 will not close. This allows a non-powered remote device to operate normally while also preventing damage to the power supplying circuitry or the remote device itself.

Figure 6:
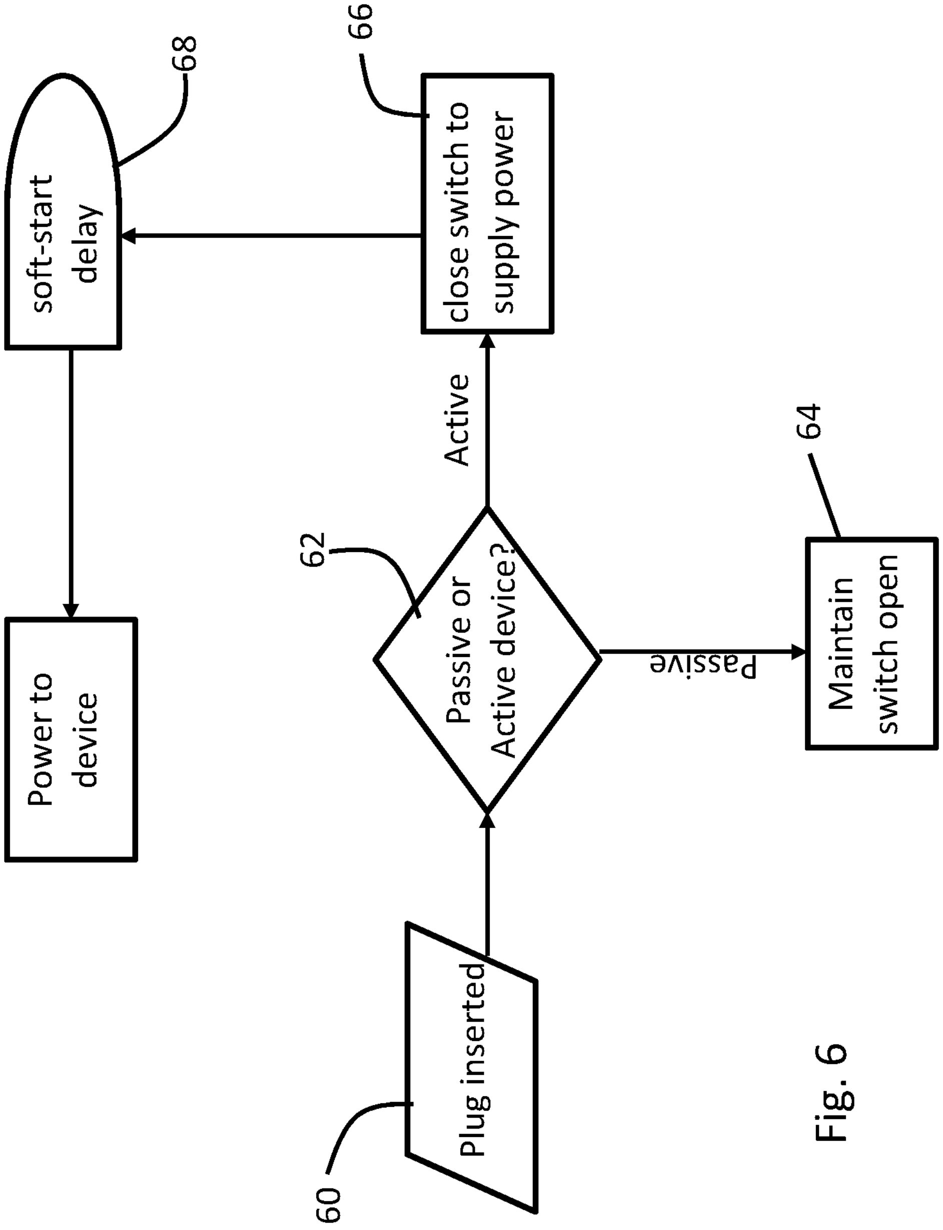
FIG. 6 is a flow chart illustrating the steps associated an algorithm in accordance with the invention.

FIG. 6 describes the logical flow in the operation of the invention. When a plug is inserted into the jack at step 60, it must be determined if the device (switch for example) connected is of the passive or active type at step 62. A passive device will not require a power, and an active device will require power to be supplied to it in order to function. If the plug is sensed to come from a passive device, the switch remains open and no power is supplied to the plug in step 64. If the plug is sensed to come from an active power requiring device such as a sensor, at step 66 the switch is closed and power is then applied in a slow and gradual manner as in step 68 so as to not damage the device or the power supply.

Figure 7:
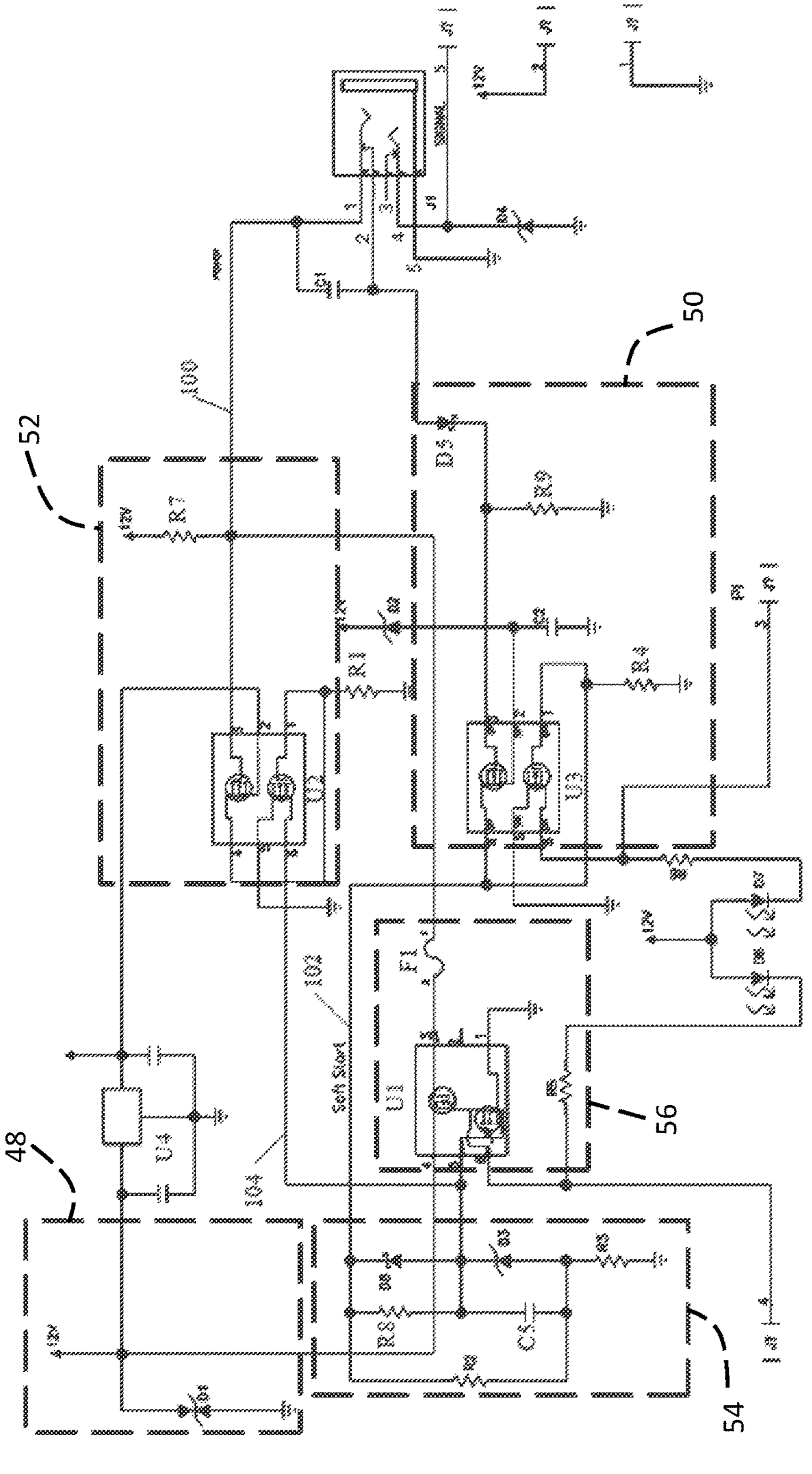
FIG. 7 is a circuit diagram of an embodiment of a power sensing connector in accordance with the invention.

FIG. 7 shows a more detailed schematic of a preferred embodiment of the invention. A connector J1 is shown as a female T/R/S jack that includes contacts for the tip, ring and sleeve of a plug (not shown in FIG. 7). The sleeve, pin 5 on the connector J1, is connected to the circuit ground. Pin 1 is the dedicated contact for the ring of a plug, and pin 4 is the dedicated contact for the tip of a plug. Pins 2 and 3 are mechanical switch contacts that make contact with pins 1 and 4 only if there is no plug in the jack. The insertion of a plug will separate pins 2 and 3 from pins 1 and 4, respectively. This can be useful for sensing when a plug is inserted.

A pull-up resistor R7 is connected between a voltage source (shown as 12 volts) and the ring (pin 1) of connector J1. If there is no plug in the connector J1, a high level signal on line 100 will conduct through J1 pin 1 to J1 pin 2, and eventually through a diode D5 to the gate (pin3) of an (upper) p-channel MOSFET in a complimentary MOSFET component, U3. The U3 p-channel MOSFET will be maintained in an OFF state when its gate (pin 3 on U3) is pulled up to a high level. When in an OFF state, the U3 p-channel MOSFET will have a low level signal at its drain (pin 4) on line 102, due to a pull down resistor R4.

If a plug is inserted into the J1 connector, J1 pin 1 will disconnect from J1 pin 2, and the gate of the U3 p-channel MOSFET will be pulled down to a low level by pull-down resistor R9. This will allow the U3 p-channel MOSFET to turn ON, and the high level signal present at its source (pin 2) will be supplied to its drain (pin 4).

When the U3 p-channel MOSFETis ON, the high level signal on the line 102 will be supplied to resistor R8 and charge capacitor C5. This is a soft-start circuit that will delay the turn-on of a (lower) n-channel MOSFET in component U1, providing a ramped signal at U1, pin 5 (gate of the U1 n-channel MOSFET). The turn-on delay of the U1 n-channel MOSFET will also delay the turn on of the (upper) p-channel MOSFET in U1. When the U1 p-channel MOSFET is ON, high-current power from the voltage source will flow through pins 4 and 3 of U1, through the fuse F1, and to the pin 1 ring contact of connector J1.

When the plug includes a ring for supplying power to the device, the line 100 will be at a high level. When no ring is present on the plug, the line 100 will be connected to ground, and therefore at a low level. A complementary MOSFET component U2 is used to monitor the line 100, and then control the signal on a line 104 which connects the drain (pin 6) of a U2 (lower) n-channel MOSFET to pin 5 of U1. If its gate (pin 1 on U2) is at a high level, the U2 n-channel MOSFET does not allow the U1 n-channel MOSFET switch to turn on, by keeping pin 5 of U1 at a low level. This will occur if there is no ring present on a plug inserted into connector J1. In this case the plug's grounded sleeve will be in contact with pin 1 on the connector J1, and the gate of the U2 (upper) p-channel MOSFET (pin 3) will be grounded, causing the U3 p-channel MOSFET to turn on. As a result, a regulated voltage from regulator U4 will pass through pins 3 and 4 on U2 and turn on the U2 n-channel MOSFET gate on pin 1. If there is a ring present to accept power on the plug, pin 1 on J1 will be at a high impedance, and the gate at pin 3 of the U3 p-channel MOSFET will be at a high level. This will not allow the U2 p-channel MOSFET to conduct the regulated U4 voltage to the complimentary U2 n-channel MOSFET gate (pin 1) which will then be pulled to ground by pull-down resistor R1. In this case, the U2 n-channel MOSFET will be OFF such that pin 5 of U1 in unaffected by U2. Therefore, the ramped voltage signal at U1, pin 5, will cause the MOSFET switch U1 to turn on and provide high-current power to the plug.

To summarize the logical operation of this circuit, if no plug is inserted into connector J1, then the plug detecting sub-circuit comprising U3 will not apply a turn-on voltage to high-current MOSFET switch U1. If a plug without a power accepting ring is inserted into the connector, the plug detecting sub-circuit comprising U3 will attempt to turn on switch U1, but the ring detecting sub-circuit comprising U2 will prevent that because it does not sense a ring on the plug. If a plug with a power-accepting ring is inserted into the connector, the sub-circuit comprising U3 will attempt to turn on switch U1. Because a ring is detected by the ring detecting sub-circuit, U2 will not prevent U1 from slowly applying power to the pin 1 of the female connector.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electric circuit for connection to either a first remote device or a second remote device, the first remote device requiring connection to a power source via a first plug having a power delivery contact for connecting the power source to the first remote device, and the second remote device not requiring connection to the power source and having a second plug not including a corresponding power delivery contact, the circuit comprising:

a jack adapted to be connected to either the first plug or the second plug;

a power requirement detection circuit for detecting whether a connected one of the first and second plugs includes the power delivery contact, and for generating a control signal representing whether the connected plug is the first plug or the second plug;

a normally deactivated switch connected between the power source and the jack and operable to supply power to the jack when activated; and a switch activation circuit responsive to the control signal for actuating the normally deactivated switch when the first plug is connected, and for maintaining the normally deactivated switch in a deactivated state when the second plug is connected.

2. The electric circuit according to claim 1 wherein the control signal is a first control signal, and further including a plug insert detection circuit for generating a second control signal representing whether either the first or second plug has been connected to the jack; and wherein the switch activation circuit is responsive to the first and second control signals.

3. The electric circuit according to claim 1 wherein the switch activation circuit includes a soft start circuit for gradually activating the switch.

4. The electric circuit according to claim 1 and further including a fuse connected between the switch and the jack.

5. The electric circuit according to claim 1 wherein the first remote device is operable to provide a first data signal to the electric circuit via the first plug, and wherein second remote device is operable to provide a second data signal to the electric circuit via the second plug.

6. The electric circuit according to claim 1 wherein the jack is T/R/S type jack.

7. The electric circuit according to claim 1 wherein the power requirement detecting circuit detects whether the power delivery contact is disabled by checking whether the power delivery contact has been grounded.

8. The electric circuit according to claim 7 wherein the power delivery contact is grounded via a direct connection to a ground contact of the connected plug.

* * * * *